May 23, 1944. R. R. HAYDEN 2,349,499
PIPE CUTTER
Filed April 28, 1941
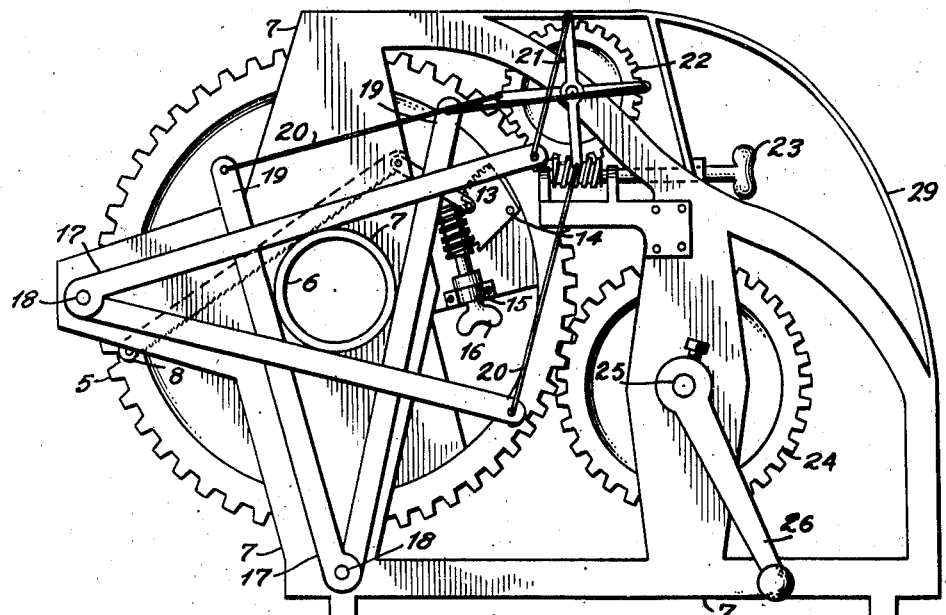
Fig. 1
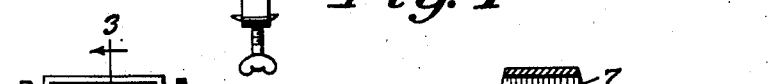
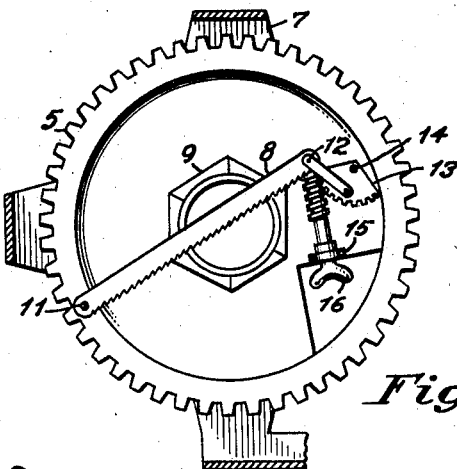
Fig. 2   Fig. 3
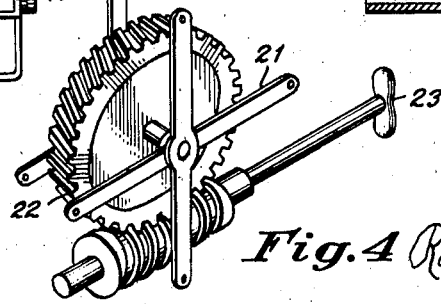
Fig. 4
Inventor
Robert R. Hayden Patented May 23, 1944

2,349,499

UNITED STATES PATENT OFFICE 2,349,499

PIPE CUTTER

Robert R. Hayden, Cross Timbers, Mo.

Application April 28, 1941, Serial No. 390,724

1 Claim. (Cl. 29—67)

This invention is a combination in a rotary pipe cutter, and more particularly to pipe cutter for cutting thin walled pipes and other cylindrical objects.

The main object of the invention is to provide a pipe cutter of the above mentioned character, which is readily adjustable to engage and cut pipes of various sizes.

A further object of the invention is the provision of a pipe cutter of the above mentioned character which is durable in construction, reliable and efficient in use and inexpensive to manufacture.

The object and advantage of the invention will be apparent during the course of the following description, in the accompanying drawing, forming a part of this specification, and in which like numerals are employed to designate like parts throughout the same.

Fig. 1 is a side elevation of the pipe cutter.

Fig. 2 is a partial edge view of the same.

Fig. 3 is a transverse section taken on line 3—3, Fig. 2.

Fig. 4 is an end view of worm gear and cross head, taken on line 4—4, Fig. 1.

In the drawing, for the purpose of illustration, I have shown a preferred embodiment of my invention. The numeral 5 denotes the main wheel, mounted on a hollow axle 6, attached within housing 7, extending perpendicular to housing and parallel with opening 7. See Figs. 12. The toothed wheel 5, with a saw 8, is mounted on axle 6, held in place with a nut 9. The saw 8 is held at one end with a bolt 11, at opposite end to a lug 12, connected to a worm gear 13, secured to rim of the wheel with a bolt 14, and rivets 15. Turning thumb screw 16 will regulate saw 8, down to the center of axle 6, as shown in Fig. 3 and Fig. 2, which by rotating around the axle will cut bolts and other cylindrical objects, as readily as thin wall pipes and tubes. Vises 17 are attached to base of housing 7, with bolts 18—18—18—18, at a right angle relation to each other on straight angle from vise attachments 18, to center of axle 6, and center of opening in housing 7, as shown in Fig. 1, Fig. 2. Free ends of vises 19 are connected by links 20, to a cross head 21 extending through top of housing 7, attached to a set of worm gearing 22. See Fig. 4. Turning thumb screw 23 will open and close vises 17, with one operation, gripping any sized pipe within the center of the axle permitting the wheel 5 to rotate with saw 8. The toothed wheel 5, driven by wheel 24, driven by the shaft 25, through the medium of any suitable system of gearing not shown in the drawing, forms no part of the present invention. This shaft may be driven by a belt, passing around a pulley, or with the handle 26. In assembling, the wheel 5 is inserted in the housing, on the axle in the space, between end of axle 6 and housing 7, permitting wheel 5 to pass through. Clamps 28 are provided to secure the cutter to a bench.

Having thus described my invention, I claim:

A cutting machine comprising a rotary head mounted on a hollow shaft, means to rotate the head, a hack saw blade mounted pivotally at one end to the head, means comprising worm mechanism mounted on the head and connected to the opposite end of said blade to adjust the blade toward and away from the center of the hollow shaft, a housing for the rotary head, work clamp means comprising angularly spaced pairs of levers on a face of the housing each pair of levers being pivotally connected at one end and being connected at their other ends by links to the respective ends of a spoked member, the spoked member being mounted on a shaft in the housing, worm means to rotate said spoked member whereby the respective members of each pair of levers are moved substantially simultaneously toward each other to clamp the work in the path of the saw and substantially concentrically with the rotating head.

ROBERT R. HAYDEN.